July 28, 1931. C. E. GLENN 1,815,943
AUTOMOBILE LUGGAGE CARRIER
Filed Aug. 21, 1929
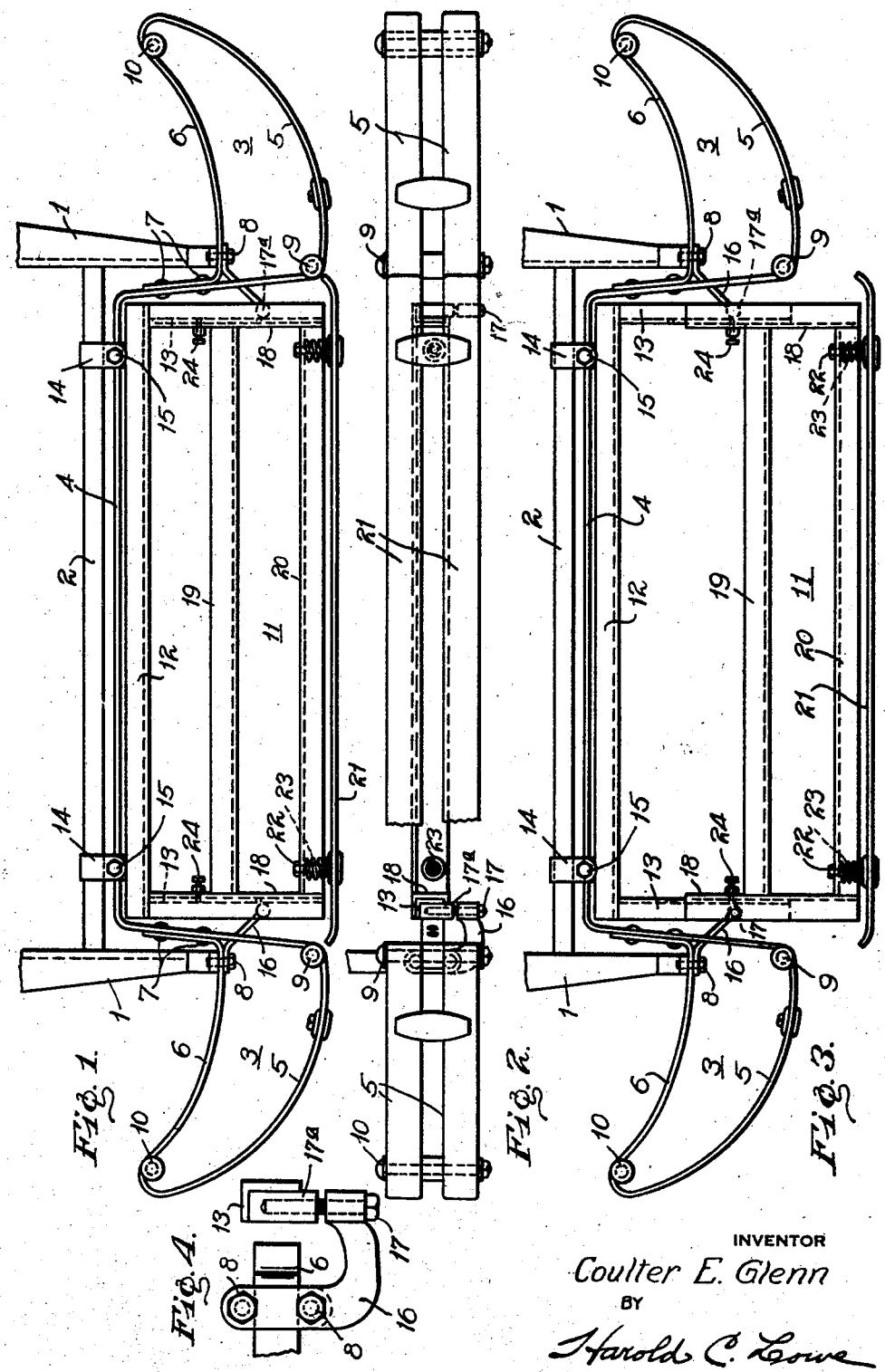
INVENTOR
Coulter E. Glenn
BY
Harold C. Lowe Patented July 28, 1931

1,815,943

UNITED STATES PATENT OFFICE

COULTER E. GLENN, OF EVANS CITY, PENNSYLVANIA

AUTOMOBILE LUGGAGE CARRIER

Application filed August 21, 1929. Serial No. 387,492.

My invention relates to luggage carriers for motor vehicles and has particular relation to those mounted upon the rear of automobiles.

One object of my invention is to provide a luggage carrier that is simple and rugged in construction and positive and reliable in operation.

Another object is to provide a luggage carrier that is adapted to occupy an inoperative position and a plurality of operative positions in accordance with the amount of luggage to be carried.

Still another object of my invention is to provide an adjustable luggage carrier having a bumper mounted thereon that is adapted to be brought tangent to two bumperettes at the rear of the automobile.

A further object of my invention is to provide a luggage carrier that is easy to slide into its various horizontal positions without it sticking or becoming difficult to move.

Briefly speaking, my invention consists in securely mounting a plurality of angle irons to the longitudinal frame members of an automobile and slidably mounting a luggage carrier comprising two channel members on said angle irons.

A bumper is resiliently mounted upon said luggage carrier and adapted to fit between the two bumperettes at the rear of the automobile.

For a better understanding of my invention reference should be made to the accompanying drawings, Figure 1 of which is a view of the rear of an automobile with a luggage carrier mounted thereon and occupying its inoperative position.

Fig. 2 is a side view of the luggage carrier shown partly in elevation and partly in section.

Fig. 3 is a plan view of the rear of the automobile and the luggage carrier illustrated in Fig. 1 of the drawings, but having the luggage carrier occupying its operative position.

Fig. 4 is an enlarged detail view of a bracket employed to mount the luggage carrier on the rear of the automobile.

Referring again to Figs. 1 and 2 of the drawings, a motor vehicle, of which only the two longitudinal frame members 1 are illustrated, and which are maintained a predetermined distance apart by a strut 2, which is located at the rear of the vehicle.

A pair of bumperettes 3 are securely mounted upon the frame members 1 and are mechanically connected by means of a flat metal strip or crossbar 4. The bumperettes each comprise two arcuate nickel plated members 5 and a bar 6. The bar 6 which is riveted to the crossbar 4 by rivets 7, is also secured to the frame member 1 by tap bolt 8. The arcuate members 5 are pivotally mounted on the crossbar 4 and the bar 6 by means of bolts 9 and 10 respectively.

The luggage carrier 11 comprises a stationary crossbar 12 and horizontal side angle bars 13 which are welded to the crossbar 12. The crossbar 12 is suspended from the strut 2 by means of brackets 14 and bolts 15. The side angle bars 13 are each supported near its rear end by an underslung bracket 16, to which it is fastened by a stud bolt 17 which is imbedded into the lug 17a. The lug 17a is welded to angle bar 13 (see Fig. 4). The bracket 16 is securely mounted on the frame 1 by means of two bolts.

The movable portion of the luggage carrier 11 comprises two side channels 18 which slidingly fit over the side angle bars 13. These channels 18 are fastened together by means of the angle members 19 and 20. It is upon the angle members 19 and 20 both of which have one of their flat sides upper most that the luggage is placed. These angle members 19 and 20 are welded to channels 18.

A plurality of flat nickel-plated bumper bars 21 are resiliently mounted upon the angle member 20 by means of a plurality of bolts 22 and springs 23. The bumper bars 21 are the same width as the arcuate members 5 of the bumperettes 3. When the movable portion of the luggage carrier 11 occupies its inoperative position as illustrated in Figs. 1 and 2 of the drawings, the bumper bars 21 are substantially tangent with the arcuate members 5. This arrangement improves the appearance of the rear of the motor vehicle.

A plurality of locking screws 24 are provided for holding the side channels 18 of the luggage carrier 11 in any predetermined position with relation to the side angle bars 13.

The operation of the luggage carrier 11 is relatively simple. All that is required is to loosen the locking screws 24 and then pulling on the bumper bars 21 to have the luggage carrier occupy its operative position. The locking screws 24 are then tightened to hold the luggage carrier in position.

While I have shown my invention in its preferred form, it is understood that it may be modified without departing from the spirit of my invention. I desire therefore to be limited only by the scope of the appended claims.

I claim as my invention:

1. The combination with a motor vehicle having a plurality of longitudinal frame members, a rear strut secured to said members, a plurality of rigid members attached to said strut and said frame members, and a luggage carrier movably mounted upon said rigid members to occupy a plurality of horizontal positions.

2. The combination with a motor vehicle having a plurality of longitudinal frame members, of a rear strut secured to said frame members, a stationary crossbar secured to said strut, a plurality of side angle bars mounted on said crossbar and said frame members, a plurality of side channels slidably mounted upon said side bars, and a plurality of angle members rigidly secured to said channels.

3. The combination with a motor vehicle having a plurality of longitudinal frame members, of a rear strut secured to said frame members, a stationary crossbar secured to said strut, a plurality of side angle bars mounted on said crossbar and said frame members, a plurality of side channels slidably mounted upon said side bars, a plurality of angle members rigidly secured to said channels, and a bumper mounted on one of said angle members.

4. The combination with a motor vehicle having a plurality of longitudinal frame members, of a plurality of side bars, means for horizontally mounting said bars at the rear of said frame and a luggage carrier mounted slidably on said bars.

5. The combination with a motor vehicle having a plurality of longitudinal frame members, of a plurality of side bars, means for mounting said bars on said frame and a luggage carrier comprising a plurality of channels for slidably mounting said carrier on said bars.

6. The combination with a motor vehicle having a plurality of longitudinal frame members, of a plurality of arcuate bumperettes mounted upon said frame members, a plurality of side bars, means for horizontally mounting said bars on said frame members, a luggage carrier movably mounted on said bars, and a bumper mounted upon said luggage carrier and adapted to a position between said bumperettes and tangent to them.

In testimony whereof, I have hereunto subscribed my name this 17th day of August, A. D. 1929.

COULTER E. GLENN.